(12) United States Patent
Komine (10) Patent No.: US 6,215,800 B1
(45) Date of Patent: Apr. 10, 2001

(54) OPTICAL PARAMETRIC OSCILLATOR WITH DYNAMIC OUTPUT COUPLER

(75) Inventor: Hiroshi Komine, Torrance, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/007,144

(22) Filed: Jan. 14, 1998

(51) Int. Cl.[7] ............................................. H01B 3/10
(52) U.S. Cl. .............................. 372/22; 372/92; 372/21; 359/326; 359/330
(58) Field of Search ........................... 372/22, 21, 92; 359/326, 330

(56) References Cited

U.S. PATENT DOCUMENTS

| | | | |
|---|---|---|---|
| 3,530,301 | 9/1970 | Boyd et al. | 307/88.3 |
| 3,609,389 | 9/1971 | Bjorkholm et al. | 307/88.3 |
| 3,617,918 | 11/1971 | Rabin | 330/4.3 |
| 3,617,936 | 11/1971 | Bjorkholm et al. | 307/88.3 |
| 3,619,637 | 11/1971 | Gete | 307/88.3 |
| 3,628,186 | 12/1971 | Ashkin | 331/107 |
| 3,824,717 | 7/1974 | Evtuhov | 307/88.3 |
| 3,965,375 | 6/1976 | Bergman, Jr. et al. | 307/88.3 |
| 3,983,406 | 9/1976 | Lax et al. | 307/88.3 |
| 4,180,751 | 12/1979 | Ammann | 307/428 |
| 4,639,923 | 1/1987 | Tang et al. | 372/21 |
| 4,880,996 * | 11/1989 | Peterson et al. | 372/21 |
| 4,897,562 | 1/1990 | Krasinski et al. | 307/427 |
| 4,965,803 | 10/1990 | Esterowitz et al. | 372/5 |
| 5,038,352 | 8/1991 | Lenth et al. | 372/21 |
| 5,047,668 | 9/1991 | Bosenberg | 359/330 |
| 5,070,260 | 12/1991 | Wong | 359/330 |
| 5,079,445 | 1/1992 | Guyer | 359/330 |
| 5,117,126 | 5/1992 | Geiger | 359/330 |
| 5,144,630 | 9/1992 | Lin | 372/22 |
| 5,159,487 | 10/1992 | Geiger et al. | 359/330 |
| 5,181,211 * | 1/1993 | Burnham et al. | 372/21 |
| 5,195,104 | 3/1993 | Geiger et al. | 372/97 |
| 5,233,462 | 8/1993 | Wong | 359/330 |
| 5,289,491 | 2/1994 | Dixon | 372/92 |
| 5,365,539 | 11/1994 | Mooradian | 372/75 |
| 5,400,173 * | 3/1995 | Komine | 372/21 |
| 5,500,865 | 3/1996 | Chakmakjian et al. | 372/22 |

OTHER PUBLICATIONS h et al, "Optical Parametric Oscillation with intracavity difference mixing"; J. Optical Soc. Am. B/vol. 12,No. 11; Nov. 1995.*

L.E. Myers, R.C. Eckardt, M.M.Fejer, R.L.Byer, W.R.Bosenberg, and J.W. Pierce, J. Opt. Soc. Am. B12, 2102–2116 (1995).

W.R. Bosenberg, A. Drobshoff, J.I. Alexander, L.E.Myers, and R.L.Byer, Opt.Lett. 21, 1336–1338 (1996).

K. Koch, G.T.Moore, and E.C. Cheung, J. Opt, Soc. Am B 12, 2268–2273 (1995).

G. T. Moore and K. Koch, IEEE J. Quantum Electron. 32, 2085–2094 (1996).

Primary Examiner—Leon Scott, Jr.
(74) Attorney, Agent, or Firm—Terry J. Anderson; Karl J. Hoch, Jr.

(57) ABSTRACT

The present invention relates generally to an apparatus that increases the conversion efficiency of optical parametric oscillators. The apparatus comprises an intracavity difference-frequency mixing optical parametric oscillator structure which receives a pulsed-pump beam from an optical pump source. The pump beam is received through an input mirror of a singly resonant cavity having an input and output end. Located within the singly resonant cavity are first and second nonlinear crystals for receiving the pump beam. The first crystal produces signal and idler waves which are received into the second crystal which produces additional idler frequency and a difference-frequency. An output mirror positioned at the output end of the cavity is totally reflective to the signal frequency and fully contains the signal frequency within the resonator cavity.

30 Claims, 5 Drawing Sheets

U.S. PATENT DOCUMENTS

| | | | |
|---|---|---|---|
| 5,530,711 | 6/1996 | Scheps | 372/20 |
| 5,619,517 | 4/1997 | Dixon | 372/21 |
| 5,640,405 * | 6/1997 | Wallace et al. | 372/22 |
| 5,696,778 | 12/1997 | MacPherson | 372/4 |
| 5,696,782 | 12/1997 | Harter et al. | 372/25 |
| 5,754,333 | 5/1998 | Fulbert et al. | 359/330 |
| 5,787,102 * | 7/1998 | Alexander et al. | 372/22 |
| 5,999,547 * | 12/1999 | Schneider et al. | 372/21 |
| 6,016,214 * | 1/2000 | Meyer, Jr. et al. | 359/330 |
| 6,101,023 * | 8/2000 | Meyer, Jr. et al. | 359/330 |

* cited by examiner (PRIOR ART)

OPTICAL PARAMETRIC OSCILLATOR WITH DYNAMIC OUTPUT COUPLER

FIELD OF THE INVENTION

The present invention relates generally to the field of optical devices, and particularly to embodiments of an apparatus that increases the conversion efficiency of optical parametric oscillators. Efficiency is increased in the OPO through use of two intracavity crystals and a resonator that fully contains the signal frequency.

BACKGROUND OF THE INVENTION

Production of adjustable coherent radiation through parametric amplification from a fixed frequency laser beam is effected through a device known as an optical parametric oscillator (OPO). The theoretical rational and complexities associated with parametric amplification and OPOs are well known to those skilled in the art.

In a conventional OPO, the OPO receives a beam of laser radiation at a pump frequency ωp from a pump source. The pump frequency ωp is received into a resonant optical cavity, wherein pump frequency ωp is directed through a nonlinear medium, usually a crystal, located within the resonant cavity. As a result, two lower energy signals are converted from the pump frequency ωp known as the signal frequency ωs and idler frequency ωi.

The content and orientation of the crystal and the design of the resonant cavity determines the signal ωs and idler ωi frequencies. The feedback within the resonant cavity causes gain in the parametric waves, a process similar to build-up in a laser cavity. The cavity can either be singly resonant in which end mirrors reflect only signal frequency ωs, or doubly resonant in which end mirrors reflect both signal ωs and idler ωi frequencies. End mirrors of the OPO are transparent to the pump frequency ωp. OPOs with singly resonant cavities are typically more stable in their output than OPOs with doubly resonant cavities.

Due to the nature of the nonlinear crystal and the conversion process, the pump frequency ωp is always higher than the frequency of the signal frequency ωs and idler ωi frequencies. The sum of the signal ωp and idler ωi frequencies is equal to the pump frequency ωp.

Power and energy conversion efficiency of the idler frequency ωi generation in an OPO is limited by the quantum efficiency and photon efficiency. Since idler frequency ωi is less than half of the pump frequency ωp, the quantum limit is always less than half and significantly more so when the idler frequency ωi is far from degeneracy. Furthermore, for pulsed OPOs, pump regeneration from signal ωs and idler ωp frequency reduces photon conversion efficiency due by temporally and/or spatially varying pump radiation. Nevertheless, idler ωi output provides a useful means of generating coherent radiation in spectral regions that are difficult to access by other sources.

There are a variety of types of crystals that may be used in OPOs for various spectral regions. In particular, nonlinear optical crystals capable of producing parametric output which have been developed for commercial applications, include, but are not limited to, potassium titanyl phosphate (KTP), potassium titanyl arsenate (KTA), lithium niobate ($LiNbO_3$), potassium niobate ($KNbO_3$), silver gallium selenide ($AgGaSe_2$), and silver gallium sulfide ($AgGaS_2$). When a fixed laser is used to generate tunable waves from certain crystals, an electric field may be applied to the crystal, or the crystal may be temperature or angle tuned, or a combination of electrical voltage, temperature and/or angle tuning is required.

Periodically poled $LiNbO_3$ (PPLN) has been shown to be particularly well-suited for OPO wavelength generation in the 1.4–4.0 μm region due to its low threshold, large non-linear coefficient, large acceptance angles, absence of walk-off, and transparency in this region (L. E. Myers, R. C. Eckardt, M. M. Fejer, R. L. Byer, W. R. Bosenberg, and J. W. Pierce, J. Opt. Soc. Am. B12, 2102–2116 (1995)). Although continuous wave OPOs utilizing PPLN have demonstrated high conversion efficiencies (W. R. Bosenberg, A. Drobshoff, J. I. Alexander, L. E. Myers, and R. L. Byer, Opt. Lett. 21, 1336–1338 (1996)), typically pulsed OPOs have not yet approached continuous wave OPO efficiencies due to factors such as back conversion of the pump wave and non-uniform pump depletion. Conversion schemes using tandem and intracavity difference frequency mixing (DFM) OPOs have been proposed and analyzed (K. Koch, G. T. Moore, and E. C. Cheung, J. Opt, Soc. Am. B 12, 2268–2273 (1995); and G. T. Moore and K. Koch, IEEE J. Quantum Electron. 32, 2085–2094 (1996)) and may help mitigate some of the limitations inherent in pulsed OPOs, however, such suggested approaches fail to significantly increase conversion efficiency.

Reference may be had to the following patents for further information concerning the state of the technology relating to OPOs (all of the references are incorporated herein by reference):

U.S. Pat. No. 5,400,173, issued Mar. 21, 1995 entitled "Tunable Mid-Infrared Wavelength Converter Using Cascaded Parametric Oscillators" to Komine, describes an apparatus for converting a fixed wavelength signal into a plurality of spectral output beams. The first resonator is coupled to a first nonlinear optical crystal for turning said first and second output beams.

U.S. Pat. No. 5,500,865, issued Mar. 19, 1996 entitled "Phased Cascading Of Multiple Nonlinear Optical Elements For Frequency Conversion", to Chakmakjian, uses two or more crystals in tandem to increase the interaction length of the nonlinear optical process for improved efficiency. Additional optical components are inserted into the optical path to adjust the phase delay of the interacting waves in order to maintain coherent generation of the product radiation.

U.S. Pat. No. 4,639,923, issued Jan. 27, 1987, entitled, "Optical Parametric Oscillator Using Urea Crystal", to Tang, et al., uses a crystal of urea as the nonlinear optical medium for constructing an OPO.

U.S. Pat. No. 5,159,487, issued Oct. 27, 1992, entitled "Optical Parametric Oscillator OPO Having A Variable Line Narrowed Output", to Geiger et al., describes an OPO that includes a pump laser for producing a pump beam; an optical resonator; an OPO crystal disposed within the optical resonator aligned with and responsive to the pump beam to produce a parametrically generated output; and a device external to the optical resonator for line narrowing the parametrically generated output.

U.S. Pat. No. 5,144,630, issued Sep. 1, 1992, entitled "Multiwavelength Solid Stated Laser Using Frequency Conversion Technique", to Lin, describes an apparatus for producing multiwavelength coherent radiations ranging from deep ultraviolet to mid-infrared. The basic laser is a pulsed Nd:YAG or Nd:YLF laser which is frequency converted by a set of novel nonlinear crystals including D-CDA, LBO, BBO, KTP and $KNBO_3$ where efficient schemes using noncritical phase matching and cylindrical focussing are employed.

U.S. Pat. No. 5,117,126, issued May 26, 1992, entitled "Stacked Optical Parametric Oscillator", to Geiger, describes a stacked OPO wherein two optical parametric crystals are coaxially disposed in a single resonator, Incident radiation is coupled to the resonator and causes parametric oscillations of the two crystals. The two crystals are independently tuned, such as by angular orientation to produce distinct components of secondary radiation.

U.S. Pat. No. 5,079,445, issued Jan. 7, 1992, entitled "High Output Coupling Cavity Design For Optical Parametric Oscillators", to Guyer, discloses a cavity design for use with a nonlinear medium which may be used as an oscillator using pump energy with frequency (FP) interacting with the nonlinear medium for parametrically generating outputs having a signal frequency (FS) and an idler frequency (FI). The parametric radiation which is produced satisfy the relationship which is common for optical parametric amplifiers and oscillators FP=FS+FI.

U.S. Pat. No. 5,070,260, issued Dec. 3, 1991, entitled "Ultrahigh-Resolution Optical Parametric Oscillator Frequency Measurement and Synthesis System", to Wong, discloses one or more OPOs which are arranged selectively, singly, serially, and/or in parallel and each OPO is responsive to an input pump beam having a fractional stability to produce output signals and idler beams having fractional stabilities that correspond to or are better than the fractional stability of the pump beam and in such a way that the sum of the frequencies of the output signal and idler beams of each OPO is constrained to be equal to the frequency of the input beam thereof.

U.S. Pat. No. 5,047,668, issued Sep. 10, 1991, entitled "Optical Walkoff Compensation In Critically Phase-Matched Three-Wave Frequency Conversion Systems". to Bosenberg, discloses a walkoff-compensation frequency conversion system such as an OPO including a pair of nonlinear crystals such as: Beta-Barium Metaborate, aligned in an optical cavity with their optical axis at an angle with respect to the axis of the cavity.

U.S. Pat. No. 4,884,277, issued Nov. 28, 1989, to Anthon, et al., discloses an intracavity frequency-modified laser of improved amplitude stability which is obtained through the use of a pluarity of nonlinear optical crystals within the laser cavity.

It is evident that it would be desirable to overcome the disadvantages of the stated art by providing an apparatus that uses the conversion scheme of tandem nonlinear crystal in an OPO-DFM structure but which substantially increased the conversion efficiency.

SUMMARY OF THE INVENTION

It is therefore the object of the present invention to provide an OPO-DFM structure for the purpose of increasing the conversion efficiency from the pump frequency $\omega p$ to the idler frequency $\omega i$. Thus, in accordance with the first embodiment of the present invention there is provided a DFM-OPO structure comprising an optical pump source for providing a pump beam at a pump frequency $\omega p$ and a singly resonant cavity having an input and output end. An input mirror positioned at the input end of said cavity couples the pump frequency $\omega p$ into the resonator cavity and directs the pump frequency $\omega p$ through first and second nonlinear optical media coaxially positioned in said cavity with the first nonlinear optical medium being positioned nearer the input of the resonant cavity and the second nonlinear optical medium being positioned nearer to the output end of the resonant cavity.

In operation, the first nonlinear optical medium, such as a PPLN crystal, sustains optical parametric oscillation by producing a signal frequency $\omega s$ and an idler frequency $\omega i$ from the pump frequency $\omega p$. Those frequencies are directed into the second nonlinear optical medium, such as a PPLN crystal, and such PPLN crystal sustains difference-frequency $\omega d$ mixing by producing an additional idler frequency $\omega i'$ and difference-frequency $\omega d$. A high reflector output mirror is positioned at the output end of the cavity and is adapted to couple the difference-frequency $\omega d$, the idler frequency $\omega i$ and the additional idler frequency $\omega i'$ external to the cavity, and said high reflector output mirror is further adapted to be totally reflective to the signal frequency $\omega s$ to fully contain the signal frequency $\omega s$ within the resonator cavity.

The present invention addresses concerns of existing art with respect to the signal frequency $\omega s$. The leakage of the signal frequency $\omega s$ through an output mirror will reduce the overall power efficiency of the OPO, but in existing art, leakage of the signal frequency $\omega s$ may be necessary to prevent high feedback which would be deleterious to the strength of the idler frequency $\omega i$ and thus, reduce overall efficiency. The present invention fully entraps the signal frequency $\omega s$ within the resonant cavity to increase maximum efficiency, but without causing deleterious feedback of the signal frequency $\omega s$.

Further, in the first embodiment of the present invention, the PPLN crystal is thermally and periodically tunable. Each of the PPLN crystals is located within a thermally tunable oven. The PPLN crystals are quasi-phase matched for optimal efficiency. Each of the PPLN crystals is 19 mm in length and 25 mm in height and anti-reflection (AR) coated. The input mirror has a 10 cm radius $CaF_2$ substrate including an HR coating at 1.48 $\mu$m. The high reflective output mirror has a 50 cm radius $CaF_2$ substrate and has a 100% reflective coating adapted to be totally reflective to signal frequency but transparent to other resultant frequencies discussed above.

It should be noted and understood that with respect to the first embodiment of the present invention, the materials suggested may be modified or substituted to achieve the general overall resultant high efficiency. The substitution of materials or dimensions remain within the spirit and scope of the present invention.

The first embodiment of the present invention is an improvement over prior OPO technology and overcomes the limitations of the technology by the known use of a tandem nonlinear optical crystal that converts signal frequency $\omega s$ into idler $\omega i$ output within the OPO cavity. The tandem crystals use optical parametric interaction in which the idler frequency $\omega i$ is amplified by the signal frequency $\omega s$ with a concomitant generation of DFM. Thus, the tandem nonlinear crystal acts as a dynamic output coupler.

The nonlinear power flow from the signal frequency $\omega s$ to the idler frequency $\omega i$ via DFM not only yields more idler output but also provides a dynamic feedback of signal frequency $\omega s$ that counteracts the onset of pump regeneration. When the OPO signal growth is properly balanced by the dynamic "loss" in the DFM crystal, sustained pump depletion occurs even for temporally varying pump intensities. Idler power can more than double with the tandem crystal relative to an optimized conventional OPO.

Unlike cascaded OPOs in which multiple frequencies may be resonant in a common cavity, the OPO with DFM of the present invention oscillates only at the signal frequency $\omega s$. Thus, the idler frequency $\omega i$ is determined by the difference between the pump ωp and the resonant signal frequency ωs. (ωi=ωp−ωs) If both of these are single-frequency, then the idler output will also be single-frequency radiation even with DFM, since the phase difference between the signal ωs and idler ωi frequencies is picked up by the DFM radiation. A by-product of DFM operation is the DFM wave which may be useful as an additional output in another spectral region.

In the OPO an application of DFM is particularly useful for converting 1.06 micron radiation (Nd:YAG laser) into 4 micron radiation in a PPLN OPO crystal. The quantum efficiency limit is 25%, but typical pulsed OPO idler energy conversion efficiencies are about 10%. Most of the OPO output energy is in the signal frequency ωs at 1.45 microns.

A DFM or tandem crystal made also from PPLN can be used as an dynamic output coupler. The 1.45 micron signal radiation amplifies the 4 micron idler radiation and generates a DFM output at 2.2 microns. The PPLN period for this interaction is longer than that for the OPO crystal, but two tandem sections on a single crystal may be periodically poled with different periods. Hence, DFM can be integrated into an OPO crystal based PPLN as discussed below with respect to the alternate embodiment.

The present invention is intended to improve the conversion efficiency of an OPO by inserting the second nonlinear optical element in the oscillator cavity. A conventional OPO uses an input radiation at the pump frequency ωp to generate the signal ωs and idler ωi output frequencies. The present invention includes a tandem element as a DFM crystal. This DFM crystal converts the generated signal ωs power into the idler ωi frequency so as to increase the overall idler power output efficiency beyond that can be achieved in a conventional OPO.

Furthermore, the DFM crystal modifies the amount of signal power that is fed back into the OPO crystal; this reduces the amount of reversed power flow back into the pump wave and thereby increases the OPO conversion efficiency. Thus, the action of the DFM crystal is strongly coupled dynamically to that of the OPO crystal.

Indeed, it may be useful to view the combined OPO and DFM crystals inside a single resonator as a coupled system of two nonlinear elements. The resonant signal ωs photons that circulate in the cavity couple the action of the two elements; signal feedback is selected using a cavity mirror that reflects the signal radiation ωs but transmits the idler radiation ωi. The coupled system is optimized by choosing the effective nonlinear coefficient and the length of materials for the OPO and DFM crystals such that the ratio of the respective parametric gains is between 1 and 3. When these conditions are met, the input pump photons ωp can be efficiently converted into the idler ωi and the difference frequency output photons ωd which are transmitted through the cavity feedback mirror. It is the dual function of the DFM crystal for additional idler frequency ωi amplification and nonlinear signal ωs feedback in achieving an overall idler efficiency improvement in an OPO.

In accordance with a second embodiment of the present invention, there is provided an OPO cascaded DFM structure for the purpose of increasing conversion efficiency from the pump frequency ωp to the idler frequency ωi. An optical pump source provides a pump beam at a pump frequency ωp and a singly resonant cavity is provided having an input and output end. A monolithic dual crystal is positioned within the resonant cavity. The monolithic nonlinear medium comprises first and second PPLN crystals formed on a single substrate. An input mirror positioned at the input end of said cavity couples the pump frequency ωp into the resonator cavity and directs the pump frequency ωp through the monolithic crystal. At the output end of the cavity, a high reflector output mirror is positioned wherein such high reflector output is adapted to couple the resultant frequencies external to the cavity. The reflector output mirror may be adapted to be totally reflective to the signal frequency ωs to fully contain the signal frequency ωs within the resonator cavity.

Further, in the second embodiment of the present invention the monolithic PPLN crystals are thermally and periodically tunable. The monolithic crystals are formed on a signal substrate and are located within a thermally tunable oven, and periodically-poled domains with different periods may be used for coarse tuning. The PPLN crystals which make up the monolithic medium are quasi-phase matched for optimal efficiency. It should be noted and understood that with respect to the second embodiment of the present invention, the material suggested may be modified or substituted to achieve the general overall resultant high efficiency. The substitute of materials or dimensions remain within the spirit and scope of the present invention.

The DFM can also include a second, cascaded DFM crystal section as shown in the second embodiment of the present invention. 2.2 micron radiation from the first DFM crystal can be used to drive a second DFM crystal that amplifies 4.1 micron idler radiation and generates 4.8 micron difference frequency radiation. Since none of these waves feedback into the OPO crystal section, cascaded DFG does not affect the signal wave oscillation in the cavity. It simply adds more output power to the idler radiation and enriches the spectral content of the mid-IR output.

DETAILED DESCRIPTION OF THE PREFERRED EMBODIMENTS

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

The present invention demonstrates a high efficiency, pulsed intracavity DFM OPO structure which uses two temperature tunable, PPLN crystals (one for functioning as the OPO, the second functioning as the DFM) in order to maximize the pump wave $\omega p \rightarrow$idler wave $\omega i$ conversion. The OPO crystal in the DFM OPO operates in the usual manner by converting pump photons $\omega p$ into signal $\omega s$ and idler $\omega i$ photons. The intracavity DFM crystal is then designed to phase match the signal and idler waves to produce a difference frequency photon ($\omega d = \omega s - \omega i$) and an additional idler photon $\omega i'$, yielding two idler photons for each converted pump photon. Since the signal wave is generated in the OPO but consumed in the nonlinear DFM process $\omega s \rightarrow \omega d + \omega i'$ the $\omega s + \omega i \rightarrow \omega p$ back conversion is minimized and pump depletion is improved. In addition, if the resonating signal wave is fully contained by use of a high reflector in place of the output coupler, build-up time is reduced and the pump depletion process is initiated at an earlier stage of the pump pulse, resulting in increased pump utilization.

Figure 1:
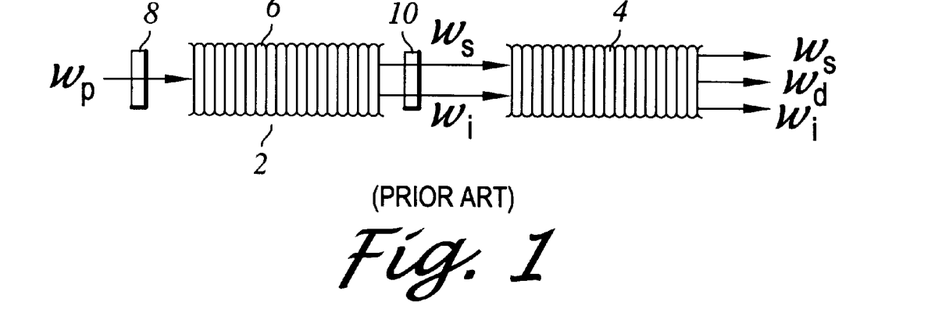
FIG. 1 is a schematic block diagram of a prior art OPO device.

Referring to FIG. 1, it is shown a conventional OPO with a DFM crystal. The OPO 2 comprises a nonlinear crystal 6 located within a resonant cavity defined by an input mirror 8 and an output mirror 10. In operation, a pump source (not shown) provides a pump signal $\omega p$ through the input mirror 8. The input mirror 8 is transparent to the pump signal $\omega p$. The pump signal $\omega p$ is directed onto the nonlinear crystal 6 and produces resultant signal frequency $\omega s$ and idler frequency $\omega i$. The signal frequency $\omega s$ and idler frequency $\omega i$ pass through the output mirror 10. The output mirror 10 may be partially reflective to allow some feedback of the signal frequency $\omega s$ and idler frequency $\omega i$. The signal frequency $\omega s$ and idler frequency $\omega i$ are received by the DFM crystal 4 which produces resultant difference-frequency $\omega d$, signal frequency $\omega s$ and idler frequency $\omega i$.

Figure 2:
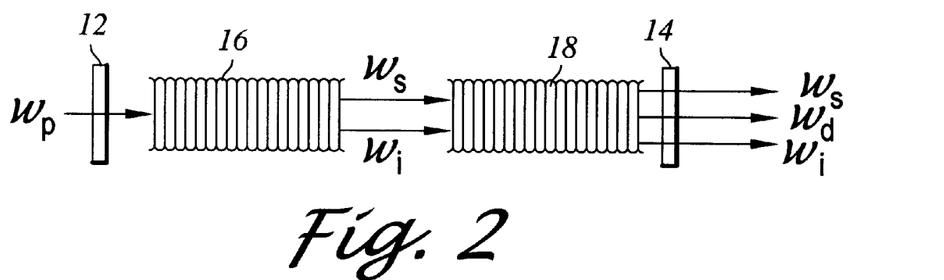
FIG. 2 is a schematic block diagram of a known OPO-DFM device.

Referring specifically to FIG. 2, there is shown a known intracavity difference-frequency mixing optical parametric oscillator which produces signal frequency $\omega s$, difference-frequency $\omega d$ and idler frequency $\omega i$. The resonant cavity is defined by the input mirror 12 and the output mirror 14. Coaxially disposed within the cavity is a nonlinear crystal 16 which acts an OPO to produce signal frequency $\omega s$ and idler frequency $\omega i$ from the pump signal $\omega p$. A second nonlinear crystal 18 is provided to effectuate difference-frequency mixing to produce a difference-frequency $\omega d$ and signal frequency $\omega s$ and idler frequency $\omega i$.

In operation, a pump source (not shown) provides a pump signal $\omega p$ into the resonant cavity through the input mirror 12. The beam is directed through the input mirror 12 onto the first nonlinear crystal 16 to produce signal wave $\omega s$ and idler wave $\omega i$. Signal frequency $\omega s$ and idler frequency $\omega i$ is received by the second nonlinear crystal 18 which act as a DFM to produce a difference-frequency $\omega d$ along with signal frequency $\omega s$ and idler frequency $\omega i$. Because the second nonlinear crystal 18 which acts as a DFM is located within the cavity, output efficiency of the idler frequency is increased. The output mirror 14 reflects a portion of the signal frequency as feedback through the cavity to provide a phase matching with the idler frequency $\omega i$ and to increase output conversion. The output mirror 14, however, is not 100% reflective to the signal frequency as overdriving the OPO-DFM with signal frequency $\omega s$ may deleteriously effect idler frequency $\omega i$ to produce less efficiency.

Figure 3:
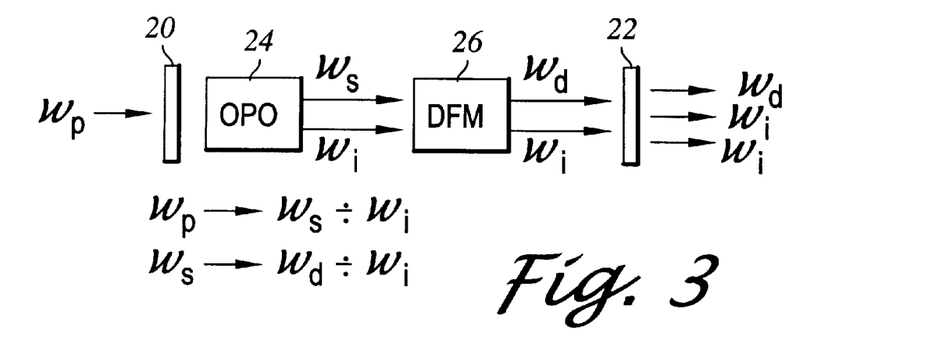
FIG. 3 is a schematic block diagram of the OPO-DFM structure of the present invention.

Referring specifically to FIG. 3, there is shown a block diagram schematic of a first embodiment of the present invention. In FIG. 3 there is shown an OPO-DFM configuration wherein a singly resonant cavity is defined by input mirror 20 and output mirror 22. A first nonlinear OPO crystal 24 is coaxially aligned with DFM nonlinear crystal 26.

In operation, a pump source (not shown) provides a pump frequency $\omega p$ through the input mirror 20 and into the singly resonant cavity. The pump signal $\omega p$ is directed onto the OPO nonlinear crystal 24 to produce a signal frequency $\omega s$ and idler frequency $\omega i$. The DFM nonlinear crystal 26 receives the signal frequency $\omega s$ and idler frequency $\omega i$ and produces difference-frequency $\omega d$ and additional idler frequency $\omega i'$. Although not shown, the signal frequency $\omega s$ and idler frequency $\omega i$ additionally pass through the DFM nonlinear crystal 26. The output mirror 22 is transparent to and allows the coupling of the difference-frequency $\omega d$, the idler frequency $\omega i$ and the additional idler frequency $\omega i'$ to be transmitted outside the cavity. The output mirror 22, however, is totally reflective (non-transparent) to the frequency signal $\omega s$ to fully contain the signal frequency within the resonant cavity.

Because the structure of the first embodiment of the present invention is optimized, the full containment of the signal frequency $\omega s$ maximizes the idler output $\omega i$. The feedback of the signal frequency increases idler output without deleteriously effecting the idler output through overdriving of the OPO-DFM system.

Preferably, the OPO nonlinear crystal 24 and DFM nonlinear crystal 26 are both AR coated phase matched PPLN crystals. The OPO 24 and DFM 26 crystals are thermally and periodically tunable. The tuning of the crystals' temperature maximizes output. Further, different domain periodicies for crystals 24 and 26 allow periodical adjustment of the PPLN crystals. It is additionally contemplated by the present invention that the crystals are quasi-phase matched.

Although not shown, the pump source in accordance with the first embodiment of the present invention produces a pump beam $\omega p$. Preferably, the pump beam $\omega p$ is pulsed radiation.

The OPO nonlinear crystal 24 may include dimensions of 19 mm in length and 0.5 mm in height for both OPO crystal 24 and DFM crystal 26. Each of the crystals may be positioned within a temperature controlled oven to allow thermal tuning. The input mirror may include a 10 cm radium $CaF_2$ substrate including an HR coating at 1.48 $\mu$m. Further, the output mirror may have a 50 cm radius $CaF_2$ substrate and have a 100% reflective coating adapted to be totally reflective to the signal frequency.

The present invention represents a pulsed, intracavity DFM OPO which uses two quasi-phase matched PPLN crystals, for a two stage conversion process that can produce two idler photons for each converted pump photon. When pumped by a 14 ns FWHM, 1.064 $\mu$m Nd:YAG laser, the singly resonant DFM OPO converts 27% of the pump power to the 3.80 $\mu$m idler wave for an equivalent single stage photon conversion efficiency of 96%. Although the DFM-OPO was not fully optimized experimenters observed 71% pump depletion at the highest pump energies used in this study, and obtain approximately 67% of the two stage quantum limited performance as useful idler output.

OPO Cavity and External DFM Experimentation

In order to demonstrate an efficient pulsed intracavity DFM OPO, a series of experiments: i) verify that the OPO signal bandwidth was less than DFM acceptance bandwidth for efficient DFM; ii) quantify the photorefractive damage effects; iii) establish OPO crystal temperature stability requirements for efficient DFM; and iv) determine the temperature bandwidth for DFM and optimum phase matching temperature and grating period conditions for DFM with a given signal and idler pair from the OPO.

Figure 4:
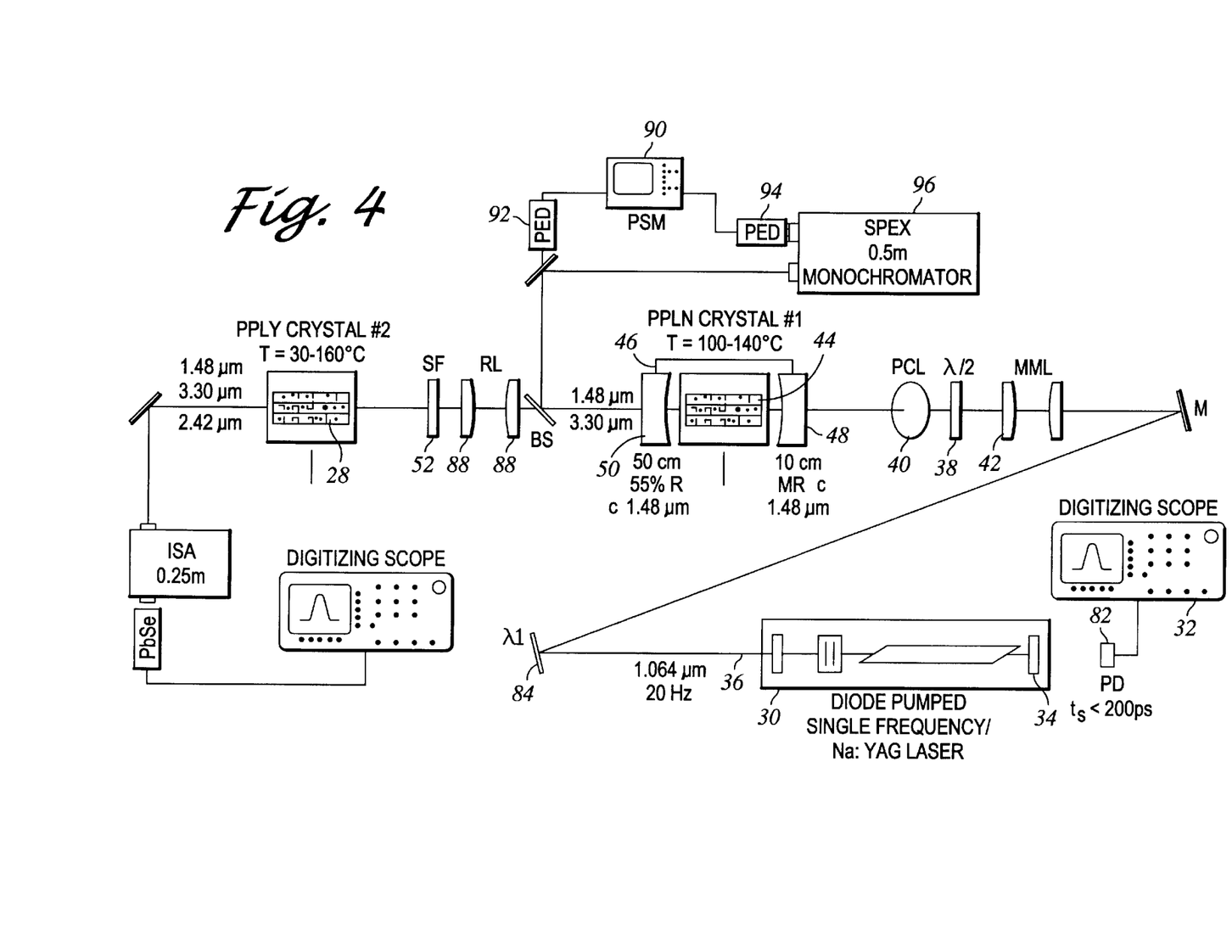
FIG. 4 is a schematic diagram of the components utilized to obtain experimental data of a OPO structure when the DFM is located outside the cavity.

The experimental arrangement for the DFM measurements is shown in FIG. 4. For purposes of the experiment the second DFM crystal 28 was located outside the cavity. The pump source 28 of all of the experiments was a diode-pumped $TEM_{00}$ single axial mode, passively Q-switched Nd:YAG laser operating at 20 Hz repetition rate. A fast photodiode 32 monitored leakage from the rear high reflector 34 of the laser. The laser consistently produced a smooth pulse envelope with a FWHM of 14 ns. The output of the laser 36 passed through a half waveplate (λZ) 38 and linear polarizer (POL) 40 combination which served as a variable attenuator. A lens pair (MML) 42 focused the pump beam to a measured waist radius ωo of 120 μm at the PPLN crystal 44. A singly-resonant oscillator cavity 46 to resonates only the 1.48 μm signal radiation ωs. The OPO cavity 46 consisted of 10 cm radium, 1.48 μm HR mirror 48 which transmitted 88% at 1.064 μm and a 50 cm radius, 55% R output coupler (output mirror) 50 which was 82% transmissive at 1.064 μm and highly transmissive at 3.8–4.0 μm. The cavity 46 length at 20 mm accommodated a 19 mm length, 0.5 mm height PPLN crystal 44 housed in a copper oven (not shown). Oven temperature was varied between 100–140° C. for the measurements.

Optimum DFM phase matching conditions in a test DFM crystal 28 (Crystal #2) by monitoring the strength of the 2.4 μm DFM signal created by mixing the 1.48 and 3.8 μm outputs from the OPO. A silicon filter 52 placed between the DFM crystal 28 and OPO 44 blocked unconverted 1.064 μm pump. The temperature of the DFM crystal 28 was varied between 30–160° C. in each of the domains to find the best periodicity and temperature match for each pair of signal ωs and idler ωi beams from the OPO (Crystal #1) 44.

Figure 5:
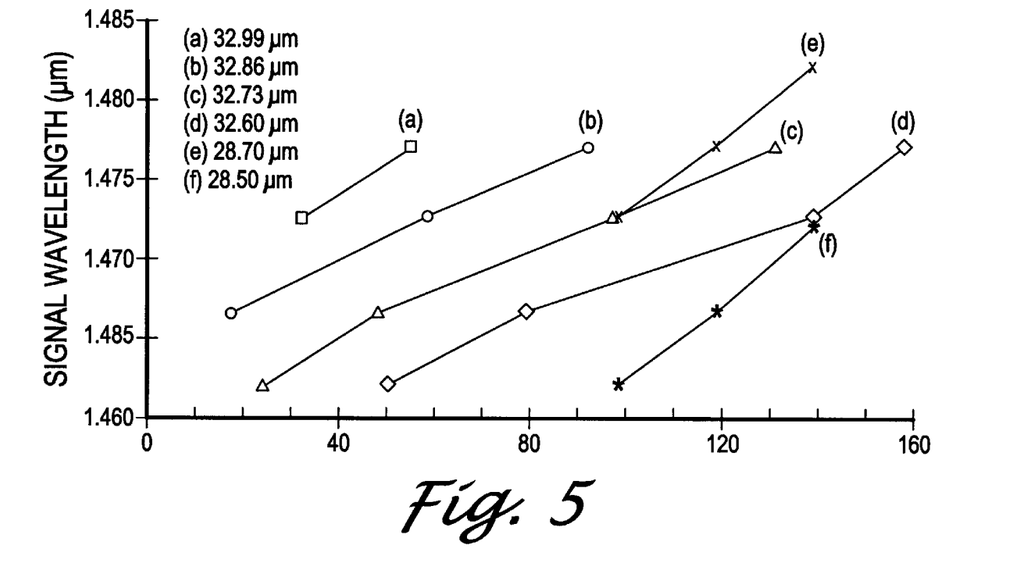
FIG. 5 is a graphical plot summary of the experimentation results from the device shown in FIG. 4.

The peak of the 2.420 μm difference frequency output was obtained at 132–134° C. in the 32.73 μm period of DFM crystal 28 with an approximate 17° C. FWHM temperature bandwidth. A summary of the DFM results obtained from DFM crystal 28 is shown in FIG. 5, where the OPO signal wavelength used to produce the difference frequency output is plotted against the DFM crystal 28 temperature at which the maximum difference frequency response was observed. Open symbols indicate the periodicity and temperature of DFM crystal 28 which generated the largest difference frequency output for the given OPO signal (and corresponding idler) wavelength. Solid symbols indicated the temperature dependence of the signal wave output from the OPO for comparison. It was noted that for a given pair of signal and idler outputs, several different combinations of periodicity and temperature in DFM crystal 28 can satisfy the DFM phase matching conditions.

Also shown in FIG. 4, the experimental arrangement for the OPO signal bandwidth, signal temperature dependents, and external difference-frequency mixing measurements are as follows: a photodiode 82, and steering mirror 84. Also shown is a beam splitter 86, $CaF_2$ relay lenses 88. A dual-channel pulse energy meter 90 and a pulse energy detector 92 are also shown. A second pulse energy detector 94 is shown in communication with a monochromator 96. FIG. 4 also shows a room temperature lead-selenide detector 98. The diode-pump single frequency laser 30 produced FWHM pump pulses of approximately 14 ns.

Intracavity DFM OPO Experiment

To demonstrate the operation of the first embodiment of the present invention as described in FIG. 3, and to obtain results to compare with the experimental results of the device as shown in FIG. 4, experimentation was conducted on the device constructed in accordance with the first embodiment of the present invention.

Figure 6:
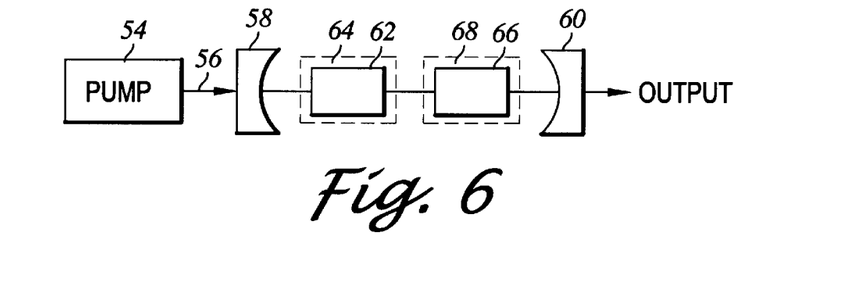
FIG. 6 is a schematic representation of the individual components associated with a first embodiment of the present invention.

Referring particularly to FIG. 6, a pump source 54 provides a pump beam 56 to the input mirror 58 of the single resonant cavity defined by the input mirror 58 and output mirror 60. Within the resonant cavity, a first PPLN crystal 62 is contained within an independently tunable copper oven 64. A second PPLN crystal 66 is aligned coaxially with the first PPLN crystal 62 within the cavity. The second PPLN crystal 66 is contained within a separately tunable copper oven 68.

The DFM OPO experiment used two 19 mm length, 0.5 mm height, AR coated PPLN crystals 62 and 66 which were held in two independent, temperature-controlled copper ovens 64 and 68, respectively. The rear mirror 60 for the DFM OPO cavity was at 10 cm radius $CaF_2$ substrate with a HR coating at 1.48 μm which had transmissions of 88%, 80% and 82% at 1.064 μm, 2.42 μm and 3.80 μm. The output mirror was a 50 cm radius $CaF_2$ substrate with either a HR coating at 1.48 μm with identical transmission properties to the rear HR described above, or a 90% reflective coating at 1.48 μm which had transmissions of 96%, 80% and 86% at 1.064 μm, 2.42 μm and 3.80 μm. The two cavity mirrors 58 and 60 were separated by a distance of 41 mm which was the minimum distances that would accommodate the two copper ovens 64 and 68. For experimentation of the intracavity DFM OPO 1.478 μm signal and 3.797 μm idler output from first crystal PPLN 62 (28.7 μm period, 120.0° C.) and the 32.73 μm period second crystal PPLN 66 at temperatures from 120–145° C. where chosen.

Figure 7A:
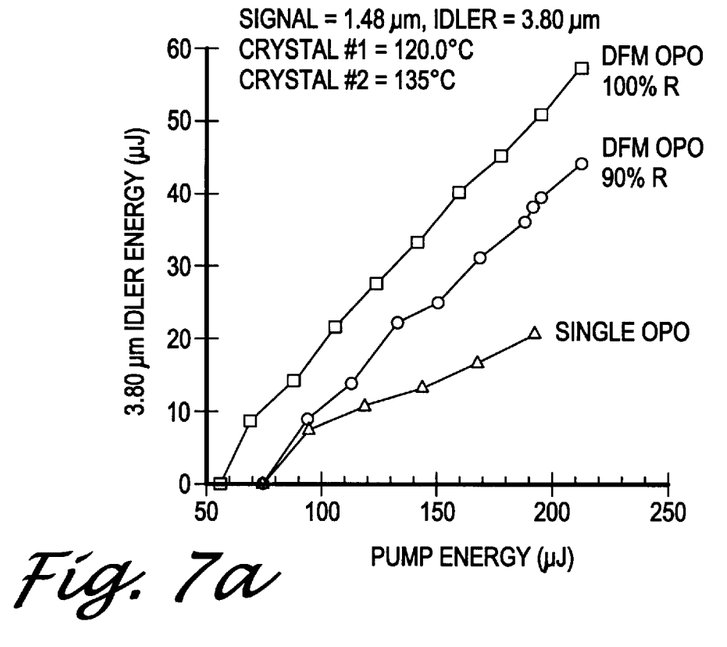
FIG. 7a is a graphical plot representation of a comparison of experimental data received in relation to the device shown in FIG. 6 compared with the device shown in FIG. 4.
Figure 7B:
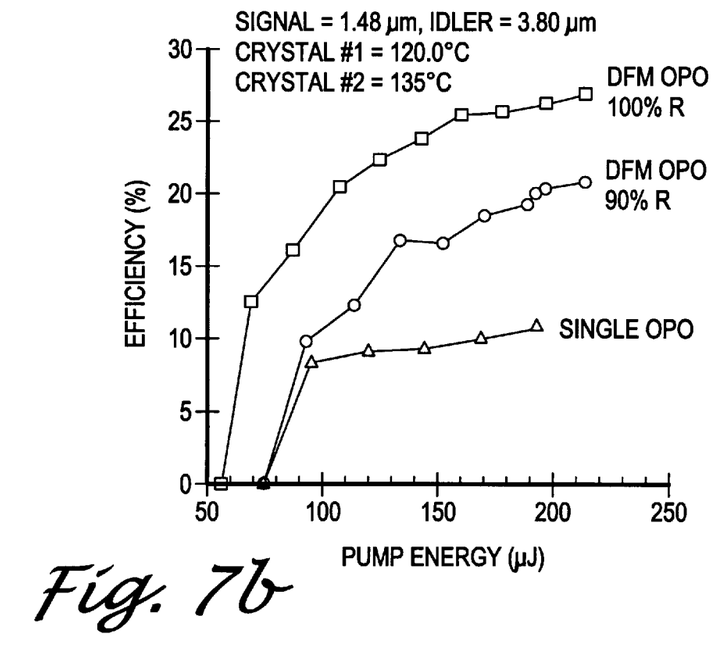
FIG. 7b is a graphical plot graph showing the efficiency of experimental data of the first embodiment of the present invention.

To examine the effect of intracavity DFM on idler conversion, the output from the single grating OPO used in the external DFM experiments was compared to that of the intracavity DFM OPO and summarized in FIG. 7a. At pump energy of 190 μJ, the DFM OPO with the 1.48 μm, 90% R output coupler produced approximately twice the idler output of the single grating OPO; when the signal wave ωs was fully contained with the 100% R output coupler the DFM OPO generated nearly 2.5 times the idler output. The corresponding efficiencies are plotted in FIG. 7b where at any pump energy above 100 μJ, the 100% R DFM OPO demonstrated more than twice the conversion efficiency of the single grating OPO, with the additional benefit of a lower pump energy threshold. At 211 μJ, the highest pump energy used for the DFM OPO experiments, efficiencies of 21% and 27% (equivalent to 96% pump photon conversion for a single grating OPO) were recorded for the 90% and 100% R DFM OPOs, respectively. In preliminary experiments using a 25 ns FWHM 1.064 μm pump, experimenters obtained efficiencies exceeding 32% (~114% pump photon conversion) with the 100% R DFM OPO; efficiencies approaching 40% may be possible with fully optimized PPLN DFM OPO.

Figure 8:
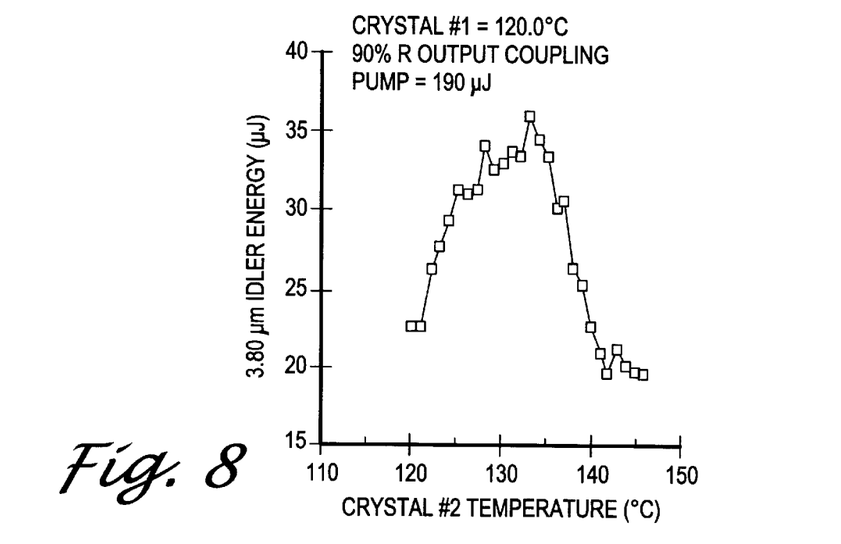
FIG. 8 is a graphical plot showing temperature data obtained from experimentation related to the device shown in FIG. 6.

The energy of the 3.80 μm idler as a function of DFM crystal 66 temperature is plotted in FIG. 8, using the idler output from the 90% R DFM OPO at a pump energy of 190 μJ. At DFM crystal 66 temperatures outside the phase matching range for the 1.48 μm and 3.80 μm waves, the DFM crystal 66 acts merely as a passive element and the 3.80 μm output energy is comparable to the single grating OPO. However, as the DFM crystal 66 temperature approaches the 132–134° C. region where the maximum DFM signal was seen for this period, the idler output increases to approximately 1.8–2.0 times the non-phase matched values.

Figure 9:
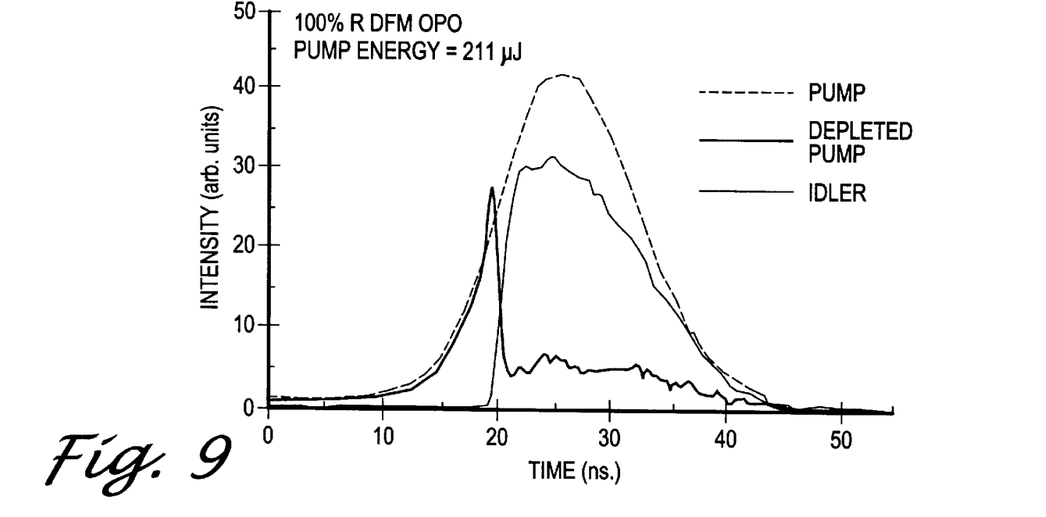
FIG. 9 is a graphical plot showing pump, depleted pump and idler temporal waveforms.

Pump, depleted pump, and idler temporal waveforms from the 100% R DFM OPO using an incident pump energy of 211 μJ are displayed in FIG. 9, where 71±5% pump depletion was recorded. Compared to our previous measurements with a single grating OPO, the intensity of the depleted pump during the conversion process is maintained at a much lower level, the result of reduced 1.48 μm+3.80→1.064 μm back conversion due to intracavity DFM. In the two stage intracavity DFM OPO as shown in FIGS. 3 and 6, the theoretical power conversion efficiency for the 1.064 μm→3.80 μm process is 56%, since two 3.80 μm photons can be produced from one 1.064 μm photon. With 71% pump depletion at the highest pump energies, the two stage conversion process was operating at 67% of the theoretical maximum.

The above experimentation demonstrates the feasibility of using an intracavity DFM scheme in an OPO to significantly enhance the pump→idler pulsed conversion efficiency using phased-matched, independently temperature tunable PPLN crystals. A limited DFM data base was established for PPLN with several signal and idler pairs, in order to optimize the choice of operating temperature and grating period for efficient intracavity DFM OPO operation. We measured a 1.064 μm pump→3.80 μm idler energy conversion efficiency of 27% for a non-optimized DFM OPO using a 14 ns FWHM, single axial mode pump pulse which is equivalent to 96% photon conversion for a single stage OPO. Equivalent single stage conversion efficiencies exceeding 114% can be achieved with longer pump pulses. The spectral and temperature bandwidth data, together with the DFM results, can be used to design integrated, dual grating PPLN crystals which will function as simple and efficient pulsed laser converters.

Figure 10:
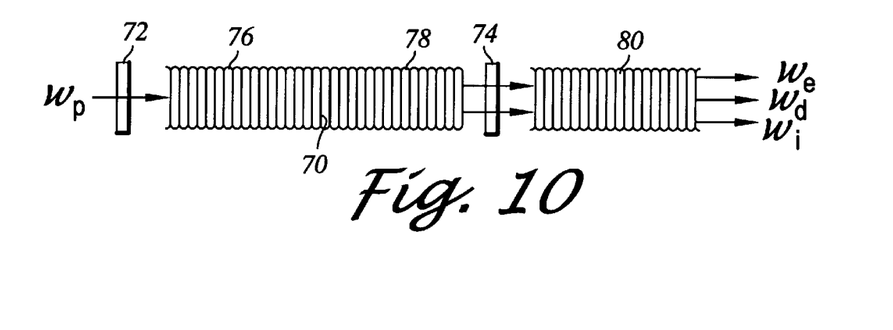
FIG. 10 is a schematic block diagram of a second embodiment of the present invention showing an OPO monolithic crystalline structure.

Referring now particularly to FIG. 10, there is shown a second embodiment of the present invention. The second embodiment of the present invention comprises a cascaded intracavity DFM-OPO wherein the DFM-OPO configuration is a monolithic crystal 70. The monolithic crystal 70 is located in the resonant cavity defined by the input mirror 72 and the output mirror 74. The monolithic crystal 70 includes a first crystal 76 formed on a single substrate with a second crystal 78 to create the monolithic crystal 70.

A pump source (not shown) provides a pump frequency ωp to be coupled through the input mirror 72 and directed onto the monolithic crystal 70. The nonlinear monolithic crystal 70 translates the pump signal ωp into a plurality of resultant signals to be transmitted through output coupler mirror 74 external the resonant cavity. As shown in FIG. 10, a second DFM crystal 80 may be implemented external the cavity for receiving the resultant frequencies for producing difference-frequency ωd, idler frequency ωi and resultant frequency ωe.

It is contemplated by the second embodiment of the present invention that the device shown in FIG. 10 that the monolithic optical crystal comprises two PPLN 76 and 78 crystals formed on a single substrate. The monolithic crystal is thermally and periodically tunable.

Further, the PPLN crystals 76 and 78 which form monolithic crystal 70 are quasi-phase matched. The pump frequency is preferably a pulse frequency and the monolithic crystal is preferably AR coated.

Further, the monolithic crystal 70, because it is thermally tunable may be positioned within a thermally tunable oven. Further, the monolithic crystal 70 may be periodically tunable using different domain periodicies.

Monolithic Dual PPLN Experimentation

Experimentation of the monolithic dual PPLN OPO architecture included two sets of gratings of different periodicies which were formed through periodic poling on (LiNbO3). A single 36 mm length PPLN had two equal length zones, in tandem of periodicity, 28.3 μm and 32.22 μm respectively. A 38 mm long OPO resonator cavity was formed by a 15 cm radius of curvature input coupler and a flat output coupler. The input coupler was coated high transmission for 1.06 μm, and high reflectivity for 1.46 μm. The output coupler was coated 90% reflective at 1.46 μm, and high transmission at 3.9 μm. The dual OPO was pumped by a 12 ns, 50 Hz, Continuum Nd: YAG laser emitting at 1.064 μm. The beam waists in the x (dimension parallel to the width dimension of the PPLN) dimensions were measured to be 90 and 120 μm respectively. The input and output energy was measured via two pyro-electric detectors giving direct energy read out. A long wavelength pass filter with a cutoff wavelength of 3.8 μm was inserted after the OPO output coupler and before the pyroelectric detector. Output power vs. input pump power is graphed in FIG. 11. Using a monochrometer then measured spectral peaks were measured centered at 1.46 μm, 2.32 μm, and 3.928 μm, corresponding exactly to the phase matched wavelengths for both the OPO grating period and DFM grating period.

Examples of OPO and DFM crystals of differing material that may be used with respect to the embodiments of the present invention include potassium titanyl phosphate ($KTiOPO_4$) and potassium or rubidium titanyl arsenate ($KTiOAsO_4$ or $RbTiOAsO_4$). These crystals use birefringent phase matching that involves a proper choice of propagation direction and polarization components. The birefringent phase matched DFG materials for the infrared region include silver gallium selenide ($AgGaSe_2$), silver gallium sulfide ($AgGaS_2$), gallium selenide (GaSe), and zinc germanium phosphide ($ZnGeP_2$). Gallium arsenide (GaAs) and zinc selenide (ZnSe) are candidates for DFM crystals based on quasi-phase matching, while periodically-poled lithium niobate (PPLN) crystals can be used for a quasi-phase matched OPO.

For birefringent DFM crystals that require orthongonally polarized signal and idler components, the OPO crystal orientation and beam propagation are selected to satisfy that condition. For quasi-phase matched DFG crystals with parallel polarization components, the OPO crystal must provide signal and idler components with parallel polarizations. The optimum combination of materials depend on the wavelengths of the pump, signal, and idler radiation.

Additional modifications and improvements of the present invention may also be apparent to those skilled in the art. Thus, the particular combination of the parts described and illustrated herein is intended to represent only one embodiment of the present invention, and is not intended to serve as limitations of alternative devices within the spirit and scope of the invention.

What is claimed is:

1. An intracavity difference-frequency mixing optical parametric oscillator for maximizing the pump to idler wave conversion comprising:

(a) an optical pump source for providing a pump beam at a primary wavelength;

(b) a singly resonant cavity having an input end and an output end;

(c) a first nonlinear optical medium disposed in said cavity for sustaining optical parametric oscillation by producing a signal frequency and an idler frequency;

(d) a second nonlinear optical medium for sustaining difference-frequency mixing by producing an additional idler frequency and a difference-frequency coaxially disposed in said cavity with said first nonlinear optical medium, wherein said second nonlinear optical medium is positioned between said first nonlinear optical medium and said output and of said cavity;

(e) an input mirror, positioned at the input end of said cavity, for coupling the pump beam into the resonator cavity and through the first and second nonlinear optical mediums; and (f) a high reflector output mirror positioned at the output end of said cavity, adapted to couple the difference-frequency, the idler frequency and the additional idler frequency external to the cavity, and further adapted to be non-transparent and to reflect the signal frequency to fully contain the signal frequency within the resonator cavity.

2. The optical parametric oscillator of claim 1 wherein said first nonlinear optical medium is PPLN.

3. The optical parametric oscillator of claim 1 wherein second nonlinear optical medium is PPLN.

4. The optical parametric oscillator of claim 1 wherein said first nonlinear optical medium is thermally tunable.

5. The optical parametric oscillator of claim 1 wherein said second nonlinear optical medium is thermally tunable.

6. The optical parametric oscillator of claim 1 wherein said first nonlinear optical medium is periodically tunable.

7. The optical parametric oscillator of claim 1 wherein said second nonlinear optical medium is periodically tunable.

8. The optical parametric oscillator of claim 1 wherein said first nonlinear optical medium is a crystal.

9. The optical parametric oscillator of claim 1 wherein said second nonlinear optical medium is a crystal.

10. The optical parametric oscillator of claim 1 wherein said first nonlinear optical medium and said second nonlinear optical medium are phase matched.

11. The optical parametric oscillator of claim 1 wherein said first nonlinear optical medium and said second nonlinear optical medium are quasi-phase matched.

12. The optical parametric oscillator of claim 1 wherein said pump beam is a pulsed frequency.

13. The optical parametric oscillator of claim 1 wherein said first nonlinear optical medium is a AR coated PPLN crystal.

14. The optical parametric oscillator of claim 1 wherein said second nonlinear optical medium is a AR coated PPLN crystal.

15. The optical parametric oscillator of claim 1 wherein said first nonlinear optical medium is an AR coated PPLN crystal 19 mm in length and 0.5 mm in height.

16. The optical parametric oscillator of claim 1 wherein said second nonlinear optical medium is an AR coated PPLN crystal 19 mm in length and 0.5 mm in height.

17. The optical parametric oscillator of claim 1 wherein said first nonlinear optical medium is positioned within a temperature controlled oven.

18. The optical parametric oscillator of claim 1 wherein said second nonlinear optical medium is positioned within a temperature controlled oven.

19. The optical parametric oscillator of claim 1 wherein said input mirror is a 10 cm radius CaF2substrate including an HR coating at 1.48 micrometers.

20. The optical parametric oscillator of claim 1 wherein said output mirror has a 50 cm radius CaF2 substrate having a 100% reflective coating adapted to be totally reflective to the signal frequency.

21. An intracavity difference-frequency mixing optical parametric oscillator for maximizing the pump to idler wave conversion comprising:

(a) an optical pump source for providing a pump beam at a primary wavelength;

(b) a singly-resonant cavity having an input and an output end;

(c) a monolithic nonlinear optical medium disposed in said cavity comprising first and second crystals joined in series and formed on a single substrate wherein said monolithic nonlinear optical medium parametrically amplifies and sustains difference-frequency mixing by producing a signal frequency, an idler frequency, an additional idler frequency and a difference-frequency;

(d) an input mirror, positioned at the input end of said cavity, for coupling the pump beam into the resonator cavity through the monolithic nonlinear optical medium; and (e) an output mirror, positioned at the output end of said cavity adapted to couple output signals external to the cavity.

22. The optical parametric oscillator of claim 21 wherein the monolithic optical medium comprises two PPLN crystals formed on a single substrate.

23. The optical parametric oscillator of claim 21 wherein said nonlinear monolithic optical medium comprises two crystals formed on a single substrate.

24. The optical parametric oscillator of claim 21 wherein said monolithic optical medium is thermally tunable.

25. The optical parametric oscillator of claim 21 wherein said nonlinear monolithic optical medium is periodically tunable.

26. The optical parametric oscillator of claim 21 wherein said first and second crystals of said monolithic nonlinear optical medium are phase matched.

27. The optical parametric oscillator of claim 21 wherein said first and second crystals of said monolithic nonlinear optical medium are quasi-phase matched.

28. The optical parametric oscillator of claim 21 wherein the pump beam is a pulsed frequency.

29. The optical parametric oscillator of claim 21 wherein said monolithic nonlinear optical medium is a AR coated PPLN crystal.

30. The optical parametric oscillator of claim 21 wherein said monolithic nonlinear optical medium is positioned within a temperature controlled oven.

\* \* \* \* \*